US012584612B1

(12) United States Patent
Lazear et al.

(10) Patent No.: US 12,584,612 B1
(45) Date of Patent: Mar. 24, 2026

(54) EAVE LIGHT ACCESSORY COVER

(71) Applicant: Jasco Products Company, LLC, Oklahoma City, OK (US)

(72) Inventors: Trey Lazear, Edmond, OK (US); Logan Alred, Oklahoma City, OK (US); Cole Horton, Oklahoma City, OK (US); Ryan Egbert, Oklahoma City, OK (US); Alisha Kesler, Edmond, OK (US); Chris Bednarz, Oklahoma City, OK (US); Duncan Kitson, Oklahoma City, OK (US)

( * ) Notice: Subject to any disclaimer, the term of this patent is extended or adjusted under 35 U.S.C. 154(b) by 7 days.

(21) Appl. No.: 18/989,093

(22) Filed: Dec. 20, 2024

(51) Int. Cl.

| | |
|---|---|
| ***F21V 17/12*** | (2006.01) |
| ***F21V 3/02*** | (2006.01) |
| ***F21V 23/00*** | (2015.01) |
| *F21Y 115/10* | (2016.01) |

(52) U.S. Cl.
CPC ................ *F21V 17/12* (2013.01); *F21V 3/02* (2013.01); *F21V 23/001* (2013.01); *F21Y 2115/10* (2016.08)

(58) Field of Classification Search
CPC .......... F21V 17/002; F21V 17/12; F21V 3/02; F21Y 2115/10; F21S 4/10; F21S 4/20
See application file for complete search history.

(56) References Cited

U.S. PATENT DOCUMENTS

2012/0268938 A1* 10/2012 Peng .......................... F21S 4/10
362/249.06

FOREIGN PATENT DOCUMENTS

CN 117006443 A * 11/2023 ............ F21V 19/003
WO WO-2006025813 A1 * 3/2006 ................ F21S 4/10

OTHER PUBLICATIONS

Innovation Q+ NPL Search (Year: 2024).*

* cited by examiner

*Primary Examiner* — Anabel Ton
(74) *Attorney, Agent, or Firm* — William D. Popejoy

(57) ABSTRACT

The present invention pertains to a cover which alters the properties of LED light. More specifically, the invention pertains to a light cover physically connected to a clip, which attaches to a mounted light, and may be attached and detached while the light remains mounted. Embodiments described for the present invention comprise a clip, whereas the clip base is comprised of a clip aperture, an electrical cord fastener comprised of an electrical cord fastener opening, a light attachment, and an optical element whereas the optical element is physically connected to a clip base. Alternate embodiments include a mounted light comprised of LEDs, an optical element cavity, whereas the clip attaches to the light, whereas the clip is configured to attach to the mounted light and to be removed from the mounted light while the light remains mounted, whereas LED light from the LEDs originates outside of the cavity.

11 Claims, 6 Drawing Sheets

EAVE LIGHT ACCESSORY COVER

BACKGROUND OF THE INVENTION

1. Field of the Invention

The present invention pertains to a cover which alters the properties of LED light. More specifically, the invention pertains to a light cover physically connected to a clip, which attaches to a mounted light, and may be attached and detached while the light remains mounted.

2. Description of the Related Art

Decorative light covers are designed to enhance the aesthetic appeal of lighting devices while providing protection. These covers can be made from a variety of materials, including glass, plastic, metal, or fabric, and are typically used in residential, commercial, and outdoor settings. They come in numerous shapes, sizes, and designs, ranging from simple to intricate patterns, and can be clear, frosted, or colored.

Undermount lights, such as eave lights, are popular lighting solutions for enhancing indoor and outdoor spaces. Eave lights are specifically designed to be installed beneath the eaves of a building roofline. The lights are used to illuminate exterior areas such as porches, walkways, exterior of homes and offices, and driveways, enhancing curb appeal while improving safety and visibility. The lights typically use LED technology and may be dimmed or controlled with smart features.

Changing an eave light or an eave light cover while on a ladder can be challenging and hazardous. Balancing on a ladder requires stability and proper positioning. The handling of tools or lights with intricate attachment methods while maintaining balance adds to the potential difficulty.

SUMMARY OF THE INVENTION

The present invention comprises an optical element which alters the properties of LED light. The device may attach and detach from a mounted light, transforming the appearance of the mounted light.

The optical element, such as a bulb, may be physically connected to a clip whereas the clip and/or a mounting plate is/are configured to attach and detach the device to a mounted light, without having to remove the light. The device may attach, using a single hand, with a clockwise, or counterclockwise, motion.

Embodiments described for the present invention comprise a clip, whereas the clip base is comprised of a clip aperture, an retention arm comprised of an retention arm opening, a mounting plate, and an optical element whereas the optical element is physically connected to a clip base.

Alternate embodiments include a clip, a clip base comprised of a clip aperture, a mounted light comprised of LEDs, a mounting plate, an optical element whereas the optical element is physically connected to a clip base, an optical element cavity, whereas the clip attaches to the mounted light, whereas the clip is configured to attach to the mounted light and to be removed from the mounted light while the light remains mounted.

Alternate embodiments include LEDs configured to be located within or outside of a clip base aperture and outside of the optical element cavity, whereas LED light from the LEDs originates outside of the optical element cavity and the optical element alters light properties of the LED light, an interior wall of a mounting plate, an retention arm comprised of an retention arm opening.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

Figure 1:
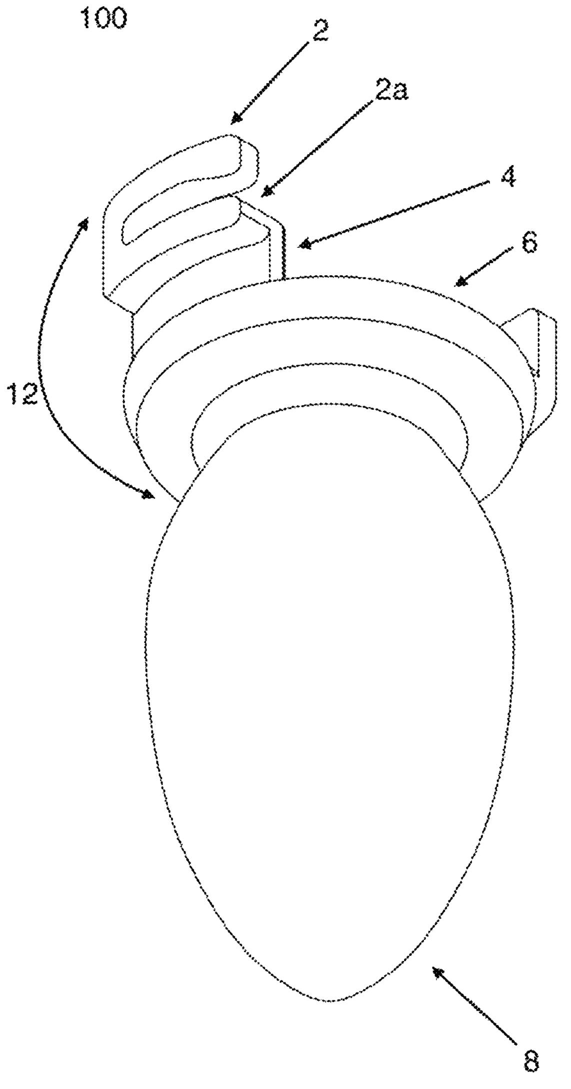
FIG. 1 shows a perspective view of an embodiment of a device.

While the invention has been described in connection with certain preferred embodiments, other embodiments would be understood by one of ordinary skill in the art and are encompassed herein.

ELEMENTS WITH CORRESPONDING REFERENCE NUMERALS

Eave Light Accessory Cover Device 100
Retention arm 2
Retention arm opening **2*a***
Eave mounting plate 4
Interior wall of Eave mounting plate **4*a***
Clip base 6
Optical element 8
Clip aperture 10
Clip 12
Optical element cavity 14
Eave light 16
LED light 18
Electrical Cord 20
Lens 22

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in order to facilitate describing the subject innovation. Moreover, it is to be appreciated that the drawings may not be to scale.

FIG. 1 shows a perspective view of an embodiment of a device. In this embodiment, an eave light accessory cover 100 securely attaches to an eave light. At least one eave light attachment 4 extends from a clip base 6, and the eave mounting plate is configured to limit the range of motion of the device relative to the eave light. In this embodiment, the eave mounting plate is concave. The concave structure facilitates a secure attachment to a round eave light housing.

At least one retention arm 2 is physically connected to the eave mounting plate. The retention arm may be comprised of a retention arm opening 2*a*. In this embodiment, the device is comprised of two eave mounting plates each physically connected to two retention arm openings, where each of the openings are configured to be orientated 180-degrees, or relatively near 180-degrees, from each other.

The device comprises a clip 12, whereas the clip is comprised of the clip base 6, at least one eave mounting plate 4, and at least one retention arm 2 and opening 2*a*.

Figure 2:
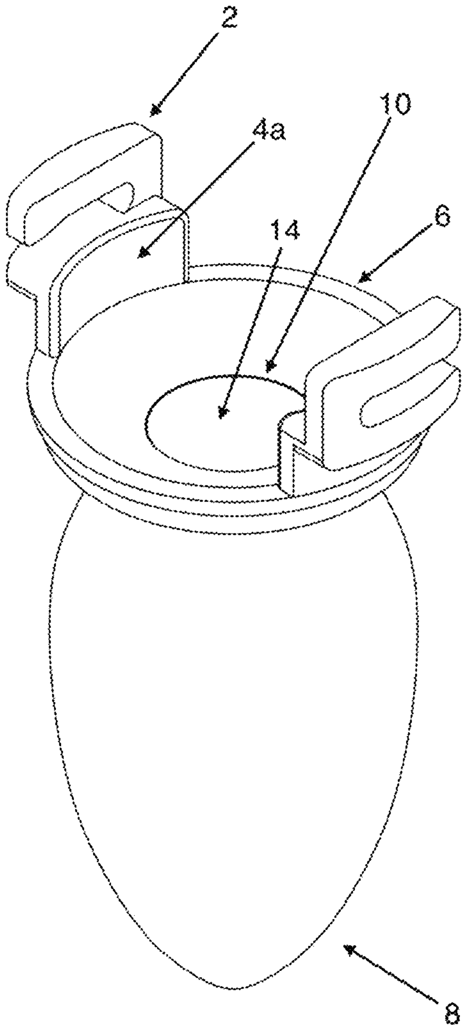
FIG. 2 shows a perspective view of the embodiment of the device.
Figure 3:
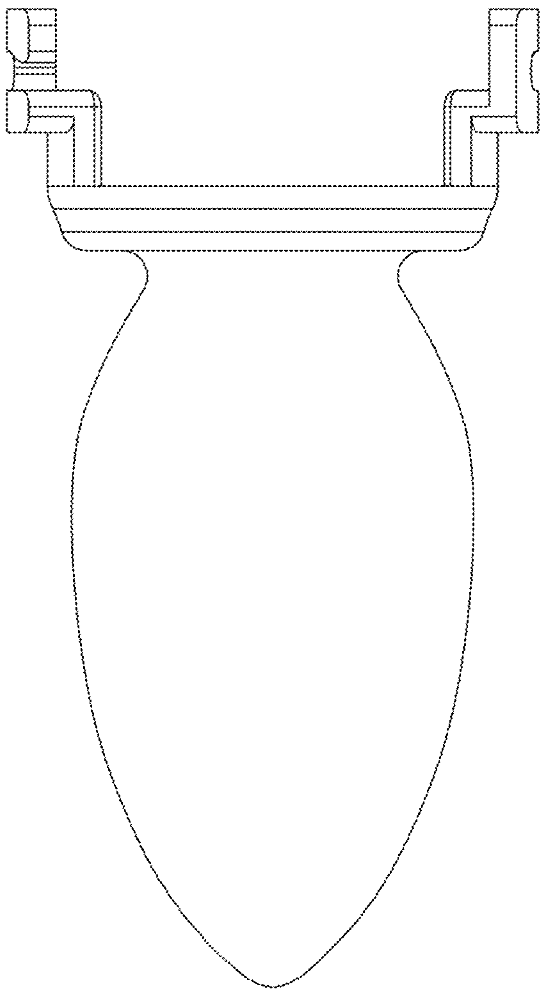
FIG. 3 shows a front elevational view of the embodiment of the device.
Figure 4:
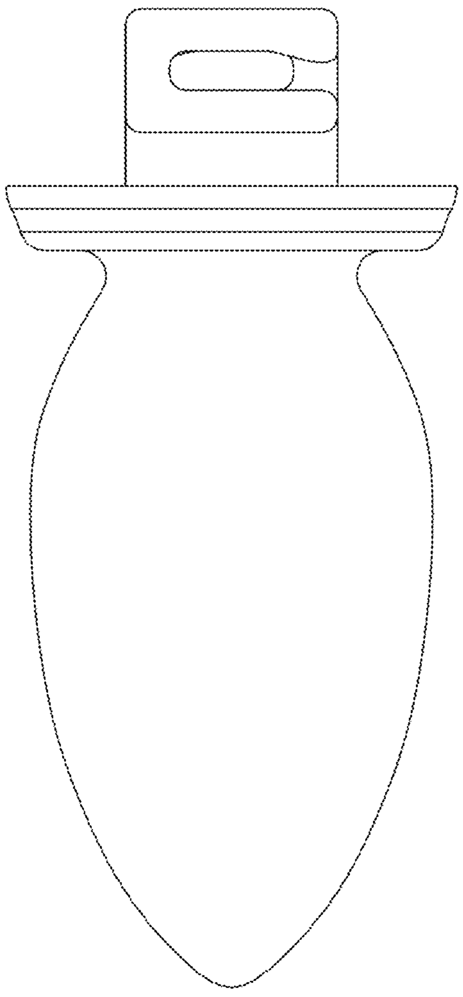
FIG. 4 shows a left side elevational view of the embodiment of the device.
Figure 5:
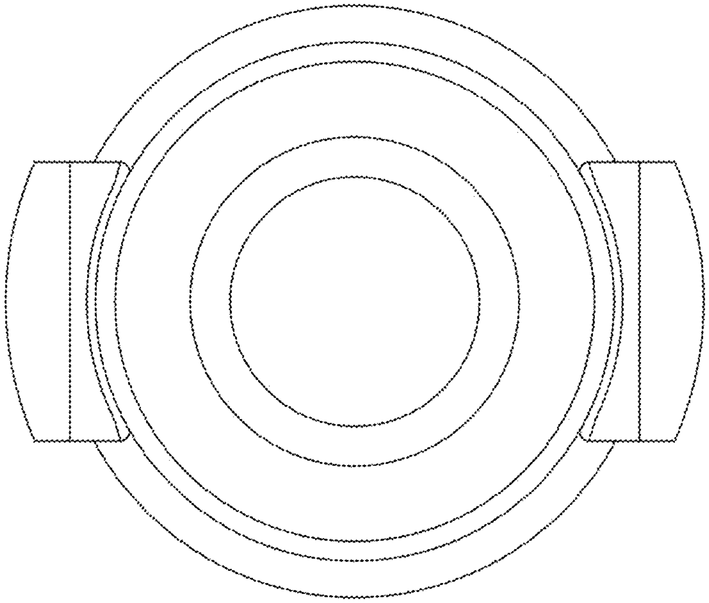
FIG. 5 shows a top plan view of the embodiment of the device.
Figure 6:
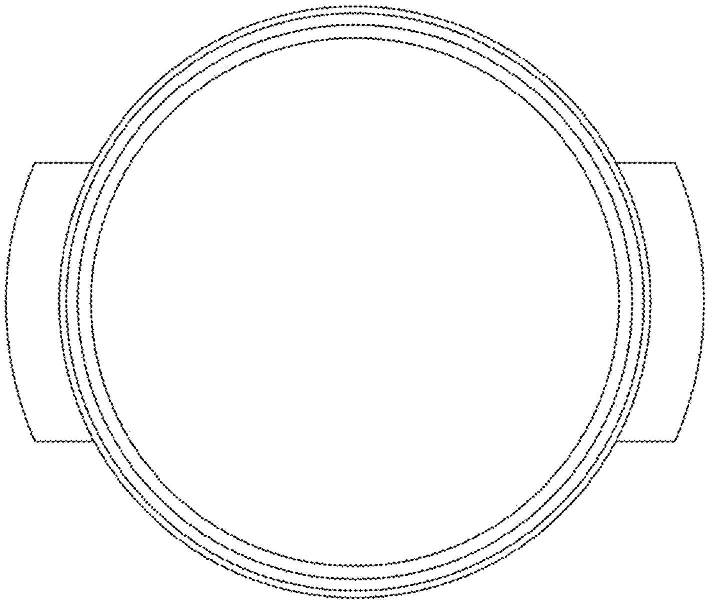
FIG. 6 shows a bottom plan view of the embodiment of the device.

FIG. 2 shows a perspective view of an embodiment of the device. In this embodiment, the device is comprised of two retention arms 2, each physically connected to two retention arm openings, where each of the openings are configured to be orientated 180-degrees, or relatively near 180-degrees, opposed from each other. In this embodiment, the interior wall of eave mounting plate 4*a* is round and configured to abut against the housing of a round mounted eave light. The device may be attached to an eave light by a clockwise motion, and removed by a counterclockwise motion. Alternate embodiments may have the device attach counterclockwise and detach clockwise, or be comprised of any attachment structures and methods known to persons having ordinary skill in the art.

A clip aperture 10 is illustrated and the optical element cavity 14 of the optical element 8 is viewed through the clip aperture. The optical element cavity 14 consists of the entire cavity created by the hollow optical element 8.

Figure 7:
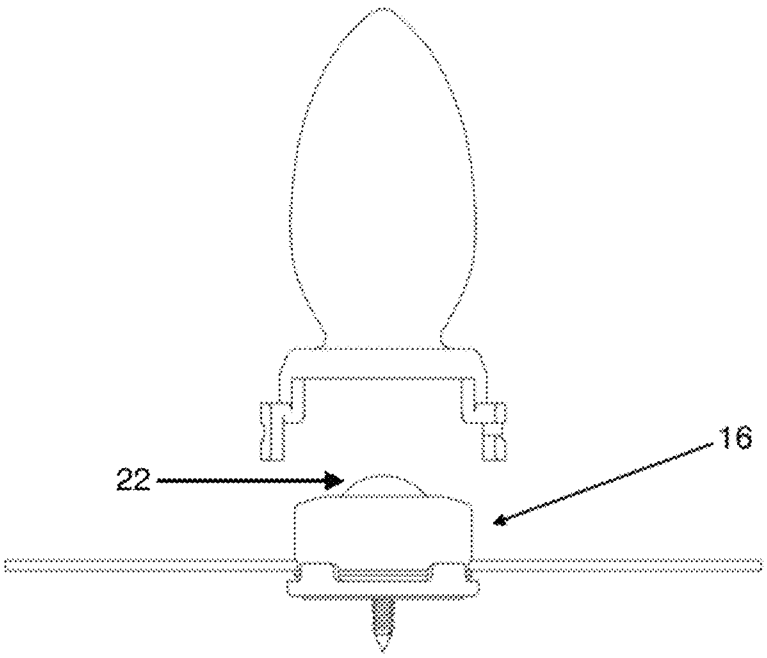
FIG. 7 shows a left side elevational view of another embodiment of the device.

FIG. 7 shows left side elevational view of another embodiment of the device. In this embodiment, an eave light 16 is comprised of a lens 22.

Figure 8:
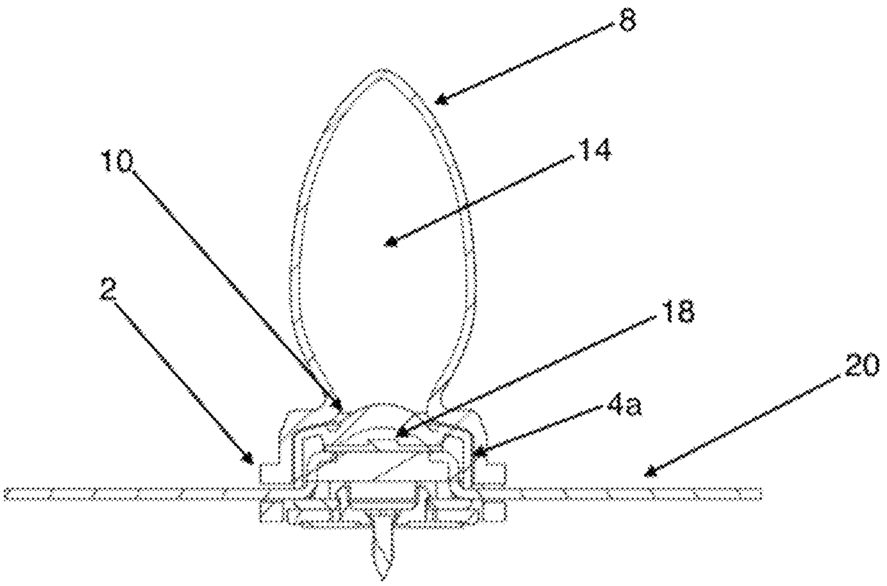
FIG. 8 shows a left side sectional view of the embodiment of the device.

FIG. 8 shows a left side sectional view of the embodiment of the device. The device is comprised of a clip aperture 10. The clip aperture 10 is configured to permit light rays to enter an optical element cavity 14 and contact an optimal element 8. In this embodiment, the optimal element is a bulb. The optical element of the invention alters light properties of the light rays. The light rays are produced by an LED light 18.

The device may be comprised of, or attach to, a pod light. FIG. 8 illustrates a light with a screw as an attachment means. An interior wall of an eave mounting plate 4*a* abuts against the housing of a light housing. The interior wall 4*a* may be curved in structure to provide stability in the attachment of a clip to the light housing. The device is further secured by the retention arm 2, whereas the retention arm attaches to an electrical cord 20. The retention arm 2 may be comprised of more than one retention arm opening. In FIG. 8, the two openings are orientated 180-degrees opposed from each other.

Figure 9:
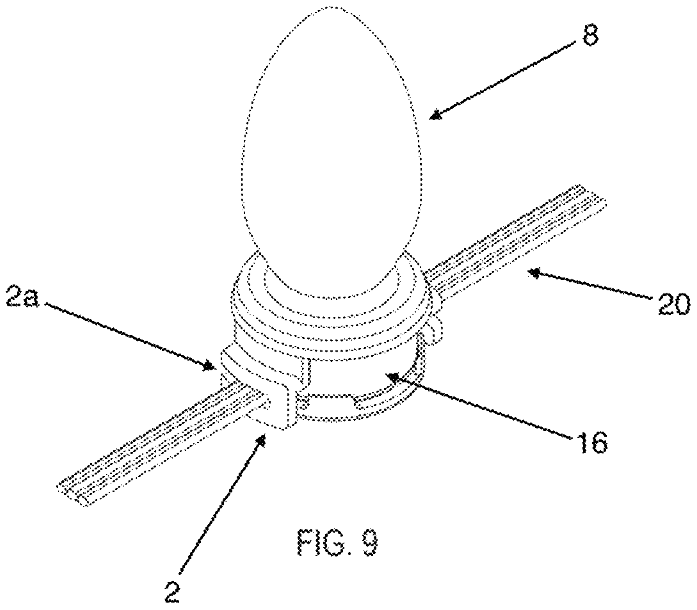
FIG. 9 shows a perspective view of the embodiment of the device.
Figure 10:
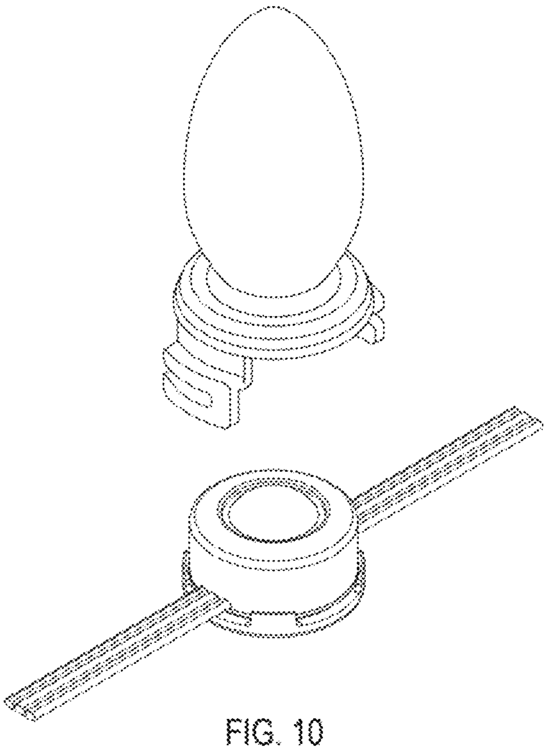
FIG. 10 shows a perspective view of the embodiment of the device.
Figure 11:
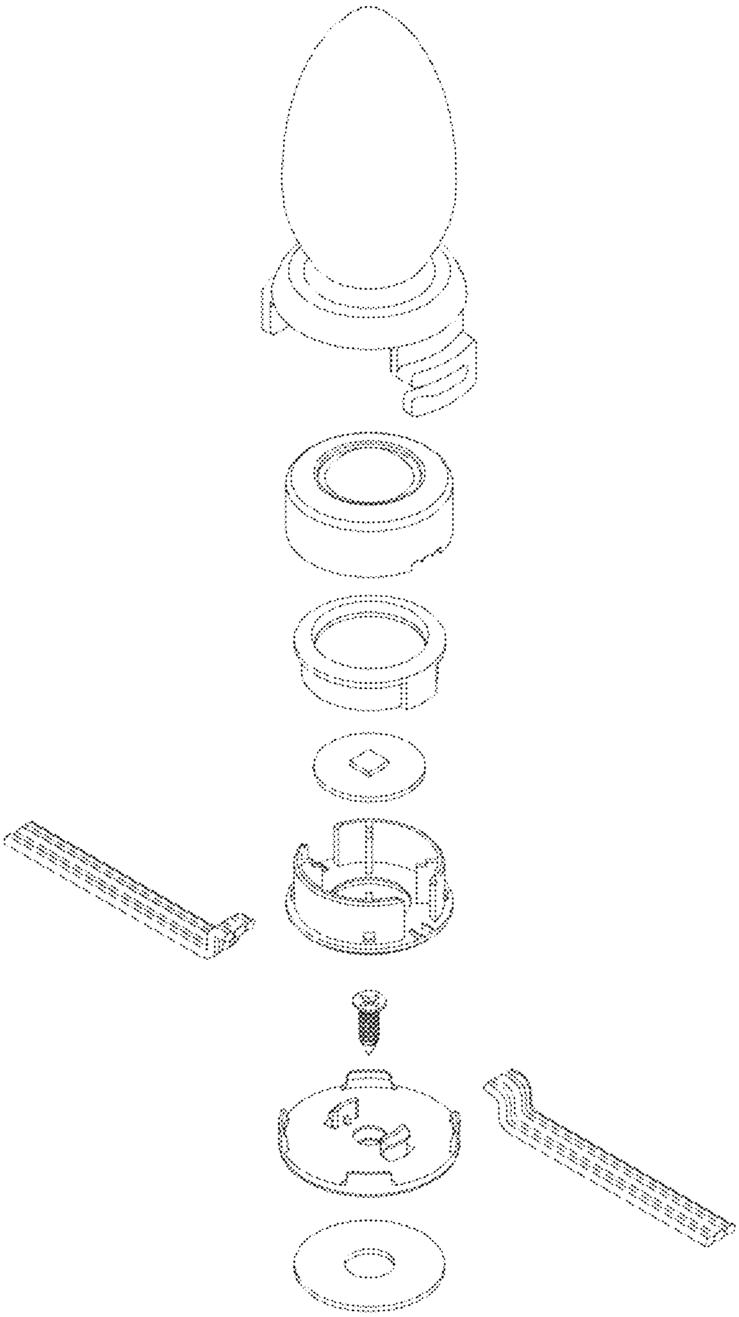
FIG. 11 shows a perspective exploded view of the embodiment of the device.

FIG. 9 shows a perspective view of an embodiment of the device. The optical element 8 and an eave light attachment to an eave light 16 is illustrated. An electrical cord 20 may electrically and physically connect to the eave light in on or more locations. Here, the eave light is a part of an electrically connected series of lights. The electrical cord 20 passes through an retention arm opening 2*a*.

The device may be comprised of a singular consistent material.

The optical element may be comprised of any shape, size, style, texture, type of bulb known to those having ordinary skill in the art, which includes: C9 bulbs and icicle bulbs. The optical element may be comprised of any level of thickness, transparency, texture, image, scene, pattern. The device may be comprised of any type of light technology known to those having ordinary skill in the art.

Alternate means of attaching the device to a light are within the scope of this disclosure. Embodiments of the current invention may comprise a clip, a clip base comprised of a clip aperture, an optical element whereas the optical element is physically connected to a clip base, and one or more of several different attachment means, including: snap-on/snap-off, magnetic, screws, adhesives, hooks, clamps, or tightly interlocking parts.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

What is claimed is:

1. A light accessory device, comprising:
- a clip;
- a round clip base comprised of a round clip aperture;
- exactly two retention arms each comprised of a retention arm opening;
- whereas the two retention arm openings are configured to be in opposing directions;
- exactly two mounting plates;
- whereas each of the two retention arms are physically connected to a separate one of the two mounting plates;
- whereas the mounting plates are configured to limit the range of motion of the light accessory device relative to a round housing of a mounted light;
- whereas the light accessory device is configured to be secured to the mounted light through the engagement of each of the two mounting arms to electrical cords attached to the mounted light;
- an optical element whereas the optical element is physically connected to the clip base; and
- whereas the optical element is configured to alter properties of light rays emitted by an LED light after the light rays have passed through a lens of the mounted light.

2. The light accessory device of claim 1, further comprising:
- an interior wall of a mounting plate;
- whereas the interior wall is concave; and
- whereas the interior wall is configured to engage an exterior of the round housing of the mounted light.

3. The light accessory device of claim 1, further comprising:

the device is comprised of a singular consistent material.

4. The light accessory device of claim 1, further comprising:

whereas the light accessory device is configured to attach to the mounted light through a twisting motion.

5. The light accessory device of claim 1, further comprising:

a light comprised of LEDs;

an optical element cavity;

the LEDs are configured to be located outside of the optical element cavity; and whereas LED light from the LEDs originates outside of the optical element cavity and the optical element alters light properties of the LED light.

6. A device, comprising:

a clip;

a round clip base comprised of a round clip aperture;

exactly two retention arms each comprised of a retention arm opening;

whereas the two retention arm openings are configured to be in opposing directions;

exactly two mounting plates;

each of the two mounting plates comprised of an interior wall;

whereas each of the two retention arms are physically connected to a separate one of the two mounting plates;

a mounted light;

whereas the mounting plates are configured to limit the range of motion of the light accessory device relative to a round housing of the mounted light;

whereas the light accessory device is configured to be secured to the mounted light through the engagement of each of the two retention arms to electrical cords attached to the mounted light;

an optical element whereas the optical element is physically connected to the clip base;

whereas the optical element is configured to alter properties of light rays emitted by an LED light after the light rays have passed through a lens of the mounted light; and whereas the clip is configured to attach to the mounted light through a twisting motion.

7. The device of claim 6, further comprising:

the mounted light is comprised of LEDs;

an optical element cavity; and the LEDs are configured to be located outside of the optical element cavity.

8. A device, comprising:

a clip;

a round clip base comprised of a round clip aperture;

a mounted light comprised of LEDs;

exactly two mounting plates;

exactly two retention arms each comprised of a retention arm opening;

whereas the two retention arm openings are configured to be in opposing directions;

whereas the mounting plates are configured to limit the range of motion of the light accessory device relative to a round housing of a mounted light;

whereas the light accessory device is configured to be secured to the mounted light through the engagement of each of the two retention arms to electrical cords attached to the mounted light;

an optical element whereas the optical element is physically connected to the clip base;

whereas the optical element is configured to alter properties of light rays emitted by an LED light after the light rays have passed through a lens of the mounted light;

an optical element cavity;

whereas the clip is configured to attach to the mounted light through a twisting motion; and whereas the clip is configured to attach to the mounted light and to be removed from the mounted light while the mounted light remains mounted.

9. The device claim 8, further comprising:

an interior wall of a mounting plate;

whereas the interior wall is concave; and whereas the interior wall is configured to engage an exterior of the round housing of the mounted light.

10. The device claim 8, further comprising:

the optical element is in the shape of a C9 bulb.

11. The device claim 8, further comprising:

the optical element is in the shape of an icicle.

* * * * *